United States Patent
Asuri et al.

(10) Patent No.: US 8,670,797 B2
(45) Date of Patent: Mar. 11, 2014

(54) MULTI-ANTENNA WIRELESS DEVICE WITH POWER AMPLIFIERS HAVING DIFFERENT CHARACTERISTICS

(75) Inventors: Bhushan Shanti Asuri, San Diego, CA (US); Yu Zhao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 13/253,003

(22) Filed: Oct. 4, 2011

(65) Prior Publication Data

US 2013/0084915 A1  Apr. 4, 2013

(51) Int. Cl.
H04M 1/00 (2006.01)
(52) U.S. Cl.
USPC ..... 455/552.1; 455/73; 455/67.11; 455/127.4
(58) Field of Classification Search
USPC ............... 455/552.1, 73, 67.11, 127.4
See application file for complete search history.

(56) References Cited

U.S. PATENT DOCUMENTS

| | | | |
|---|---|---|---|
| 6,075,995 A * | 6/2000 | Jensen | 455/552.1 |
| 6,163,709 A * | 12/2000 | Chorey et al. | 455/552.1 |
| 7,542,740 B1 | 6/2009 | Granger-Jones | |
| 7,876,159 B2 | 1/2011 | Wang et al. | |
| 2006/0250182 A1 | 11/2006 | Takeda et al. | |
| 2010/0277252 A1 | 11/2010 | Gorbachov | |
| 2010/0291888 A1 * | 11/2010 | Hadjichristos et al. | 455/127.4 |
| 2011/0018632 A1 | 1/2011 | Pletcher et al. | |
| 2011/0057730 A1 * | 3/2011 | Makioka et al. | 330/295 |
| 2011/0143821 A1 | 6/2011 | Hwang et al. | |
| 2011/0207413 A1 * | 8/2011 | Su et al. | 455/67.11 |
| 2011/0263213 A1 * | 10/2011 | Harel et al. | 455/73 |
| 2012/0021697 A1 * | 1/2012 | Yang | 455/73 |
| 2012/0329515 A1 * | 12/2012 | Husted et al. | 455/552.1 |

FOREIGN PATENT DOCUMENTS

WO 0024124 A1 4/2000

OTHER PUBLICATIONS

International Search Report and Written Opinion—PCT/US2012/058814—ISA/EPO—Feb. 7, 2013.

* cited by examiner

*Primary Examiner* — David Q Nguyen
(74) *Attorney, Agent, or Firm* — Ramin Mobarhan

(57) ABSTRACT

A wireless device with power amplifiers having different characteristics to support transmission on multiple antennas is disclosed. These power amplifiers may have different gain, different maximum output power levels, etc. in order to meet requirements of different wireless systems. In an exemplary design, an apparatus includes first and second power amplifiers having different characteristics. The first power amplifier amplifies a first input signal and provides a first output signal for a first antenna. The second power amplifier amplifies the first input signal or a second input signal and provides a second output signal for a second antenna, e.g., in a MIMO mode or a transmit diversity mode. Only the first or second power amplifier amplifies another input signal and provides another output signal to the first antenna, e.g., in a CDMA mode or a GSM mode.

22 Claims, 11 Drawing Sheets

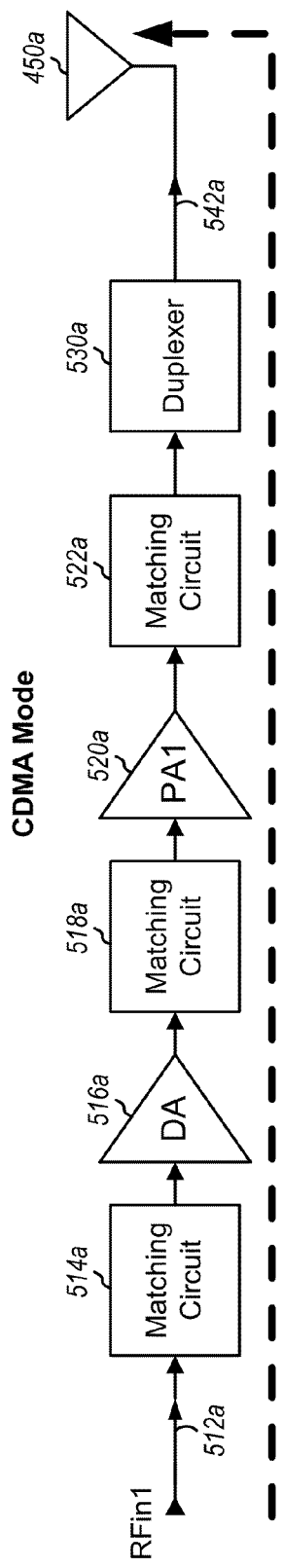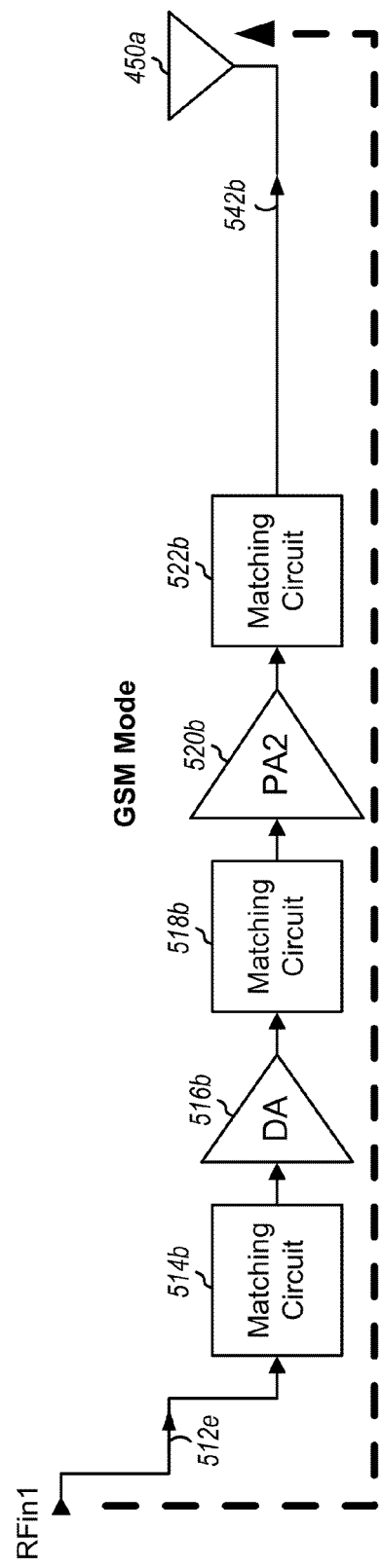

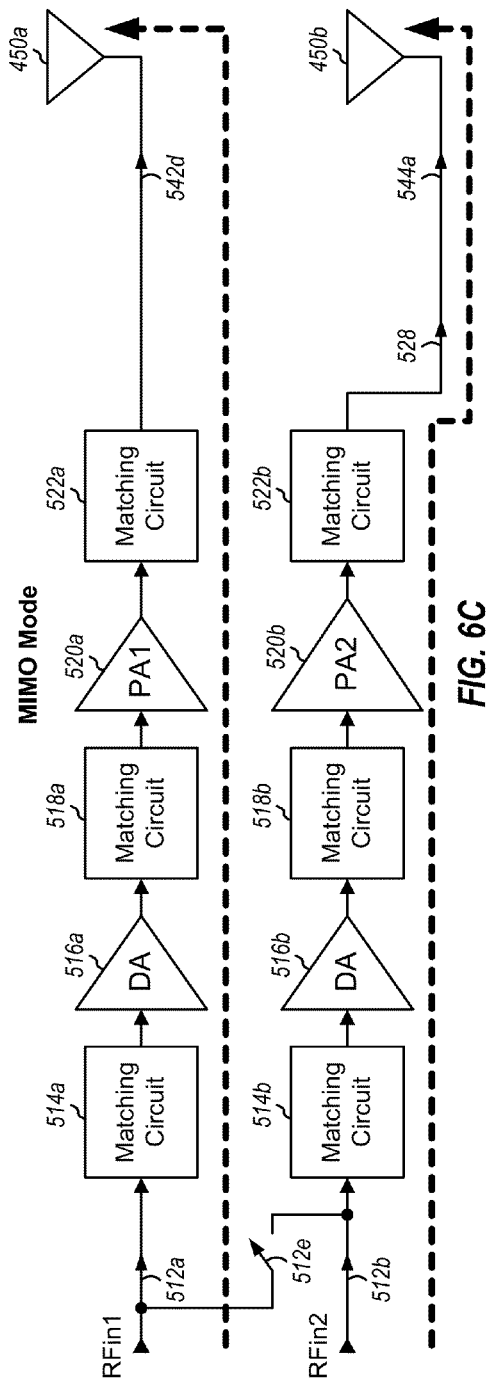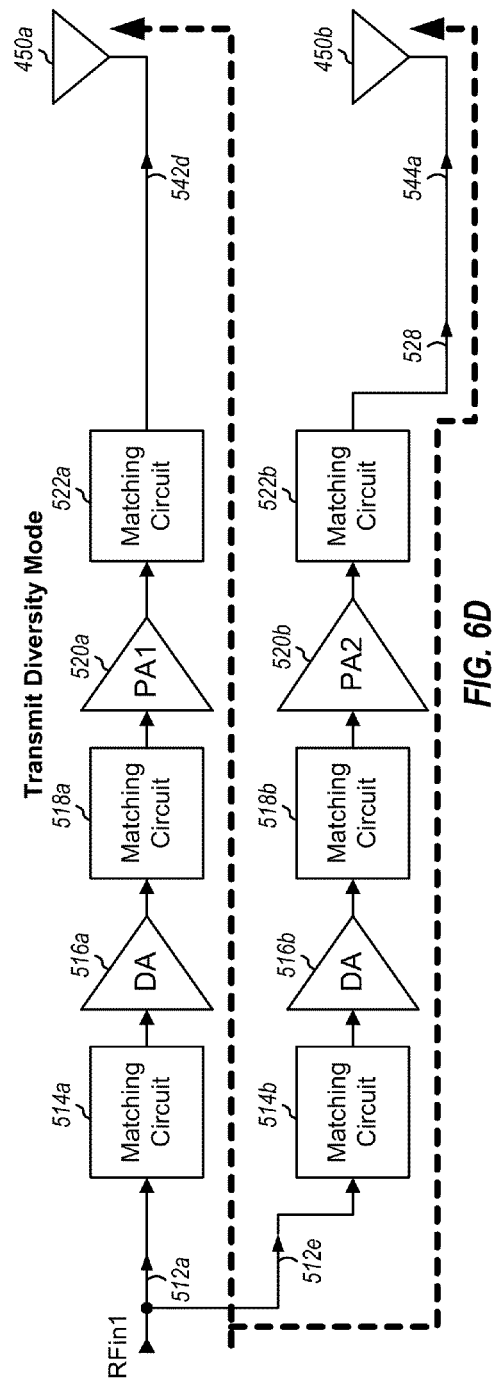

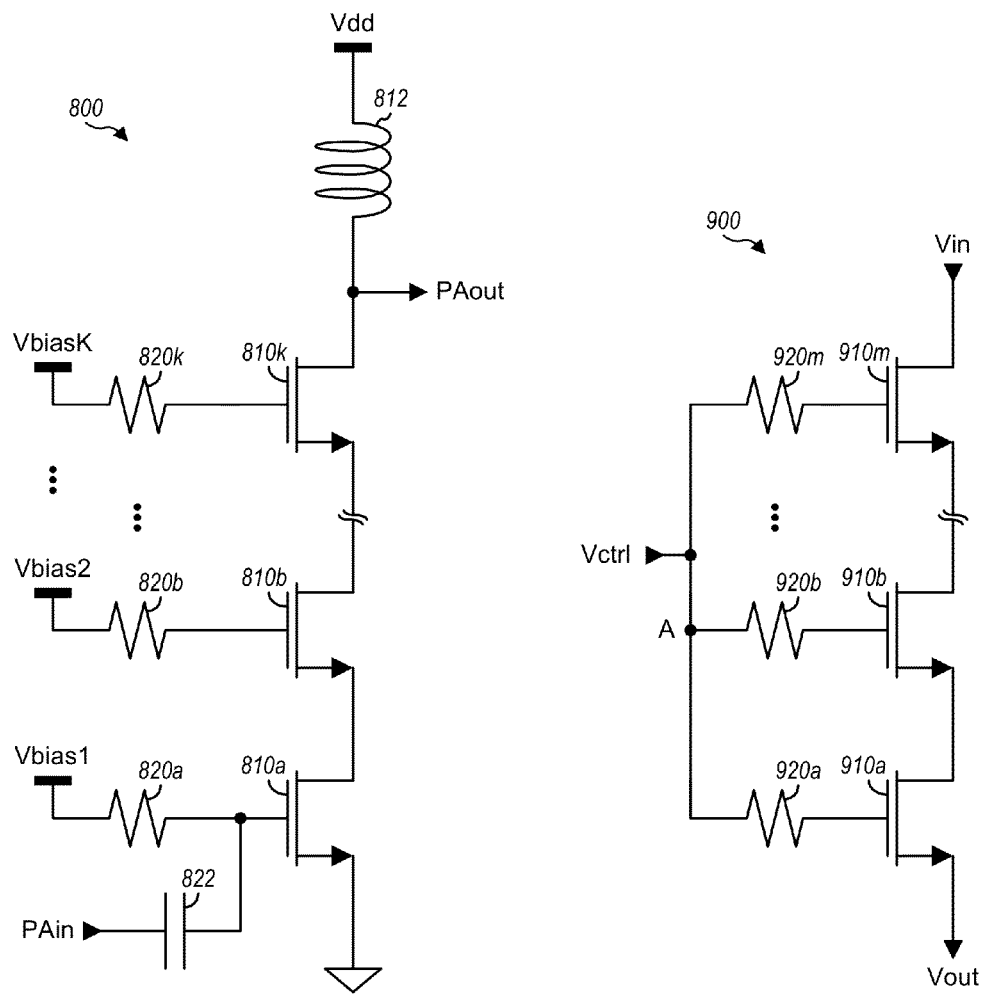
*FIG. 8*  *FIG. 9*

MULTI-ANTENNA WIRELESS DEVICE WITH POWER AMPLIFIERS HAVING DIFFERENT CHARACTERISTICS

BACKGROUND

I. Field

The present disclosure relates generally to electronics, and more specifically to a wireless device.

II. Background

A wireless device (e.g., a cellular phone or a smart phone) may include a transmitter and a receiver coupled to an antenna to support two-way communication. For data transmission, the transmitter may modulate a radio frequency (RF) carrier signal with data to obtain a modulated signal, amplify the modulated signal to obtain an output RF signal having the proper output power level, and transmit the output RF signal via the antenna to a base station. For data reception, the receiver may obtain a received RF signal via the antenna and may condition and process the received RF signal to recover data sent by the base station.

A wireless device may include multiple transmitters and multiple receivers coupled to multiple antennas in order to improve performance. However, the circuitry to support transmission on multiple antennas typically increases the cost and size of the wireless device.

BRIEF DESCRIPTION OF THE DRAWINGS

FIGS. 6A to 6E show signal paths in the transmit module in FIG. 5 for five operating modes.

FIG. 8 shows a schematic diagram of a power amplifier.

FIG. 9 shows a schematic diagram of a switch.

DETAILED DESCRIPTION

The detailed description set forth below is intended as a description of exemplary designs of the present disclosure and is not intended to represent the only designs in which the present disclosure can be practiced. The term "exemplary" is used herein to mean "serving as an example, instance, or illustration." Any design described herein as "exemplary" is not necessarily to be construed as preferred or advantageous over other designs. The detailed description includes specific details for the purpose of providing a thorough understanding of the exemplary designs of the present disclosure. It will be apparent to those skilled in the art that the exemplary designs described herein may be practiced without these specific details. In some instances, well-known structures and devices are shown in block diagram form in order to avoid obscuring the novelty of the exemplary designs presented herein.

A wireless device utilizing non-identical power amplifiers having different characteristics to support transmission on multiple antennas is described herein. Non-identical power amplifiers are power amplifiers that are designed to have different characteristics such as different gains, different maximum output power levels, different operating points, different linearity, etc. This may be achieved with different circuit designs, different transistor sizes, different bias currents, different bias voltages, etc., for the non-identical power amplifiers. The non-identical power amplifiers may be used for different radio technologies, and the different characteristics of these power amplifiers may be due to different requirements imposed by these radio technologies.

Figure 1:
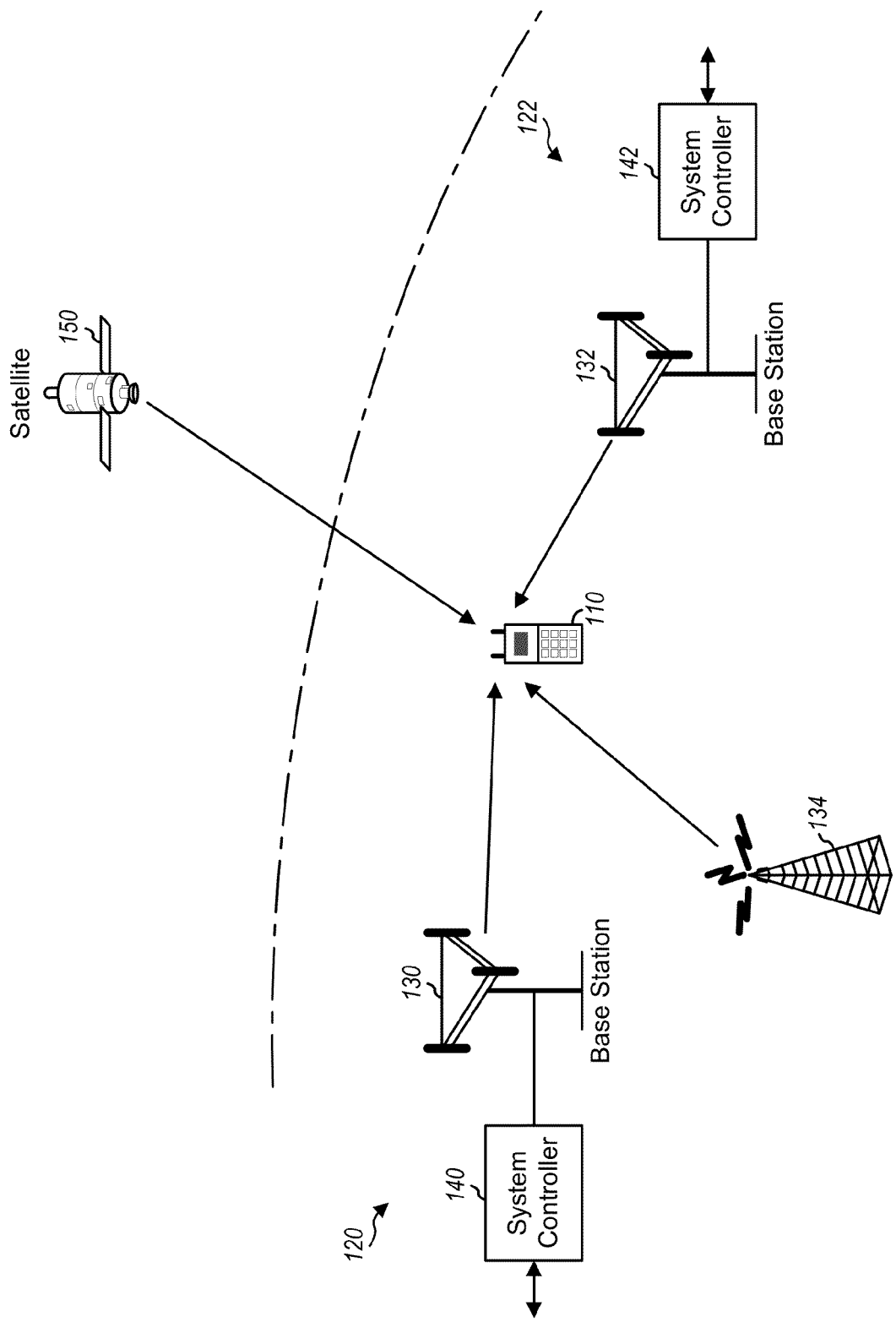
FIG. 1 shows a wireless device capable of communicating with different wireless communication systems.

FIG. 1 shows a wireless device 110 capable of communicating with different wireless communication systems 120 and 122. Wireless systems 120 and 122 may each be a Code Division Multiple Access (CDMA) system, a Global System for Mobile Communications (GSM) system, a Long Term Evolution (LTE) system, a wireless local area network (WLAN) system, etc. A CDMA system may implement Wideband CDMA (WCDMA), cdma2000, or some other version of CDMA, which may be generically referred to as "CDMA" in the description herein. For simplicity, FIG. 1 shows wireless system 120 including one base station 130 and one system controller 140, and wireless system 122 including one base station 132 and system controller 142. In general, each wireless system may include any number of base stations and any set of network entities.

Wireless device 110 may also be referred to as a user equipment (UE), a mobile station, a terminal, an access terminal, a subscriber unit, a station, etc. Wireless device 110 may be a cellular phone, a smart phone, a tablet, a wireless modem, a personal digital assistant (PDA), a handheld device, a laptop computer, a smartbook, a netbook, a cordless phone, a wireless local loop (WLL) station, a Bluetooth device, etc. Wireless device 110 may be equipped with any number of antennas. Multiple antennas may be used to support multiple-input multiple-output (MIMO) transmission to increase throughput, transmit diversity to combat deleterious path effects (e.g., fading, multipath, and interference), carrier aggregation to increase throughput, etc. Wireless device 110 may be capable of communicating with wireless system 120 and/or 122. Wireless device 110 may also be capable of receiving signals from broadcast stations (e.g., a broadcast station 134). Wireless device 110 may also be capable of receiving signals from satellites (e.g., a satellite 150) in one or more global navigation satellite systems (GNSS).

Figure 2:
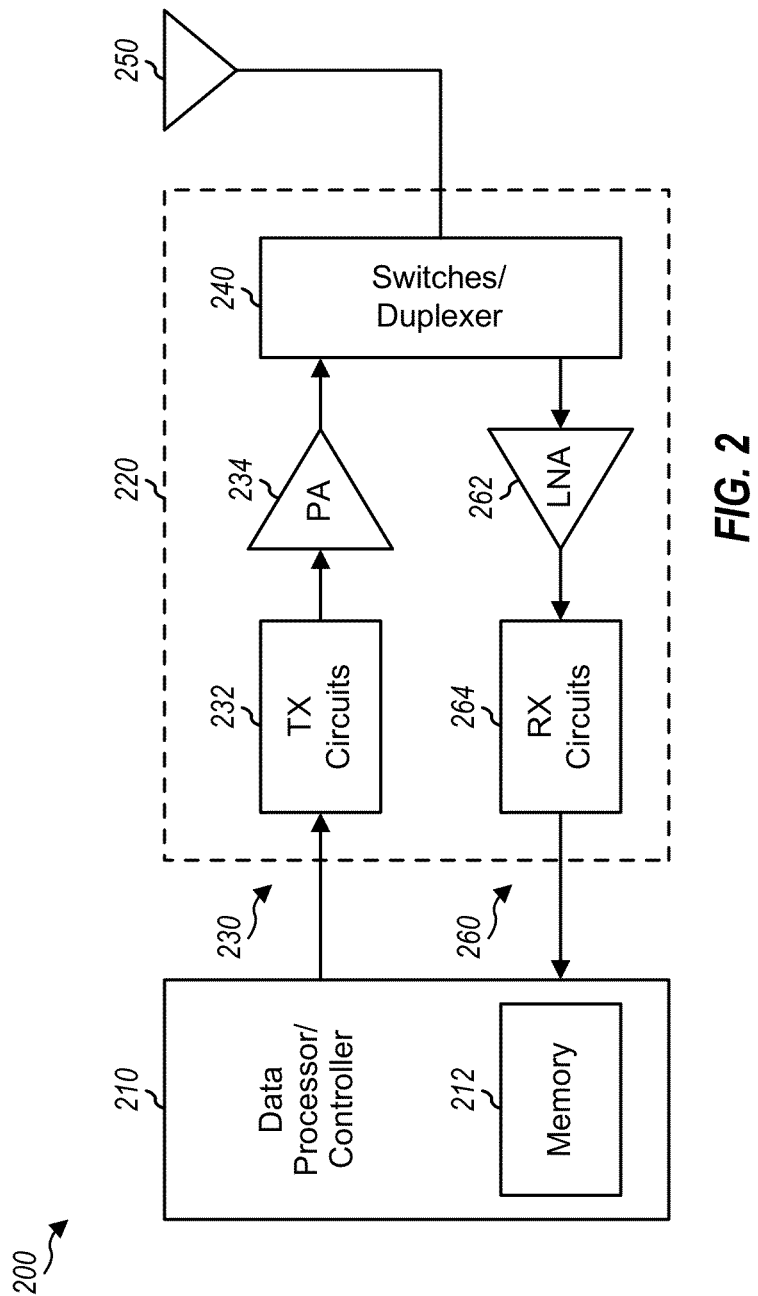
FIG. 2 shows a block diagram of a wireless device with a single antenna.

FIG. 2 shows a block diagram of a wireless device 200, which may be an exemplary design of wireless device 110 in FIG. 1. In this exemplary design, wireless device 200 includes a data processor/controller 210, a transceiver 220, and an antenna 250. Transceiver 220 includes a transmitter 230 and a receiver 260 that support bi-directional wireless communication.

In the transmit path, data processor 210 processes (e.g., encodes and modulates) data to be transmitted and provides an analog output signal to transmitter 230. Within transmitter 230, transmit (TX) circuits 232 amplify, filter, and upconvert the analog output signal from baseband to RF and provide a modulated signal. TX circuits 232 may include amplifiers, filters, mixers, an oscillator, a local oscillator (LO) generator, a phase locked loop (PLL), etc. A power amplifier (PA) 234 receives and amplifies the modulated signal and provides an amplified RF signal having the proper output power level. Switches/duplexer 240 receive the amplified RF signal from power amplifier 234 and provide an output RF signal to antenna 250. Switches/duplexer 240 may include switches and/or a duplexer.

In the receive path, antenna 250 receives signals from base stations and/or other transmitter stations and provides a received RF signal, which is routed through switches/duplexer 240 and provided to receiver 260. Within receiver 260, a low noise amplifier (LNA) 262 amplifies the received RF signal and provides an input RF signal. Receive (RX) circuits 264 amplify, filter, and downconvert the input RF signal from RF to baseband and provide an analog input signal to data processor 210. RX circuits 264 may include amplifiers, filters, mixers, an oscillator, an LO generator, a PLL, etc.

Data processor/controller 210 may perform various functions for wireless device 200. For example, data processor 210 may perform processing for data being transmitted via transmitter 230 and received via receiver 260. Controller 210 may control the operation of TX circuits 232, power amplifier 234, RX circuits 264, LNA 262, and/or switches/duplexer 240. A memory 212 may store program codes and data for data processor/controller 210.

Wireless device 200 may support communication with CDMA, GSM, LTE, 802.11, and/or other wireless systems. Different wireless systems may utilize different radio technologies and may have different output power requirements for an output RF signal transmitted via an antenna. For example, a GSM system may require a maximum output power of +33 dBm whereas a CDMA system may require a maximum output power of +27 dBm. Wireless device 200 may be designed to provide the maximum output power for each system supported by wireless device 200.

Figure 3:
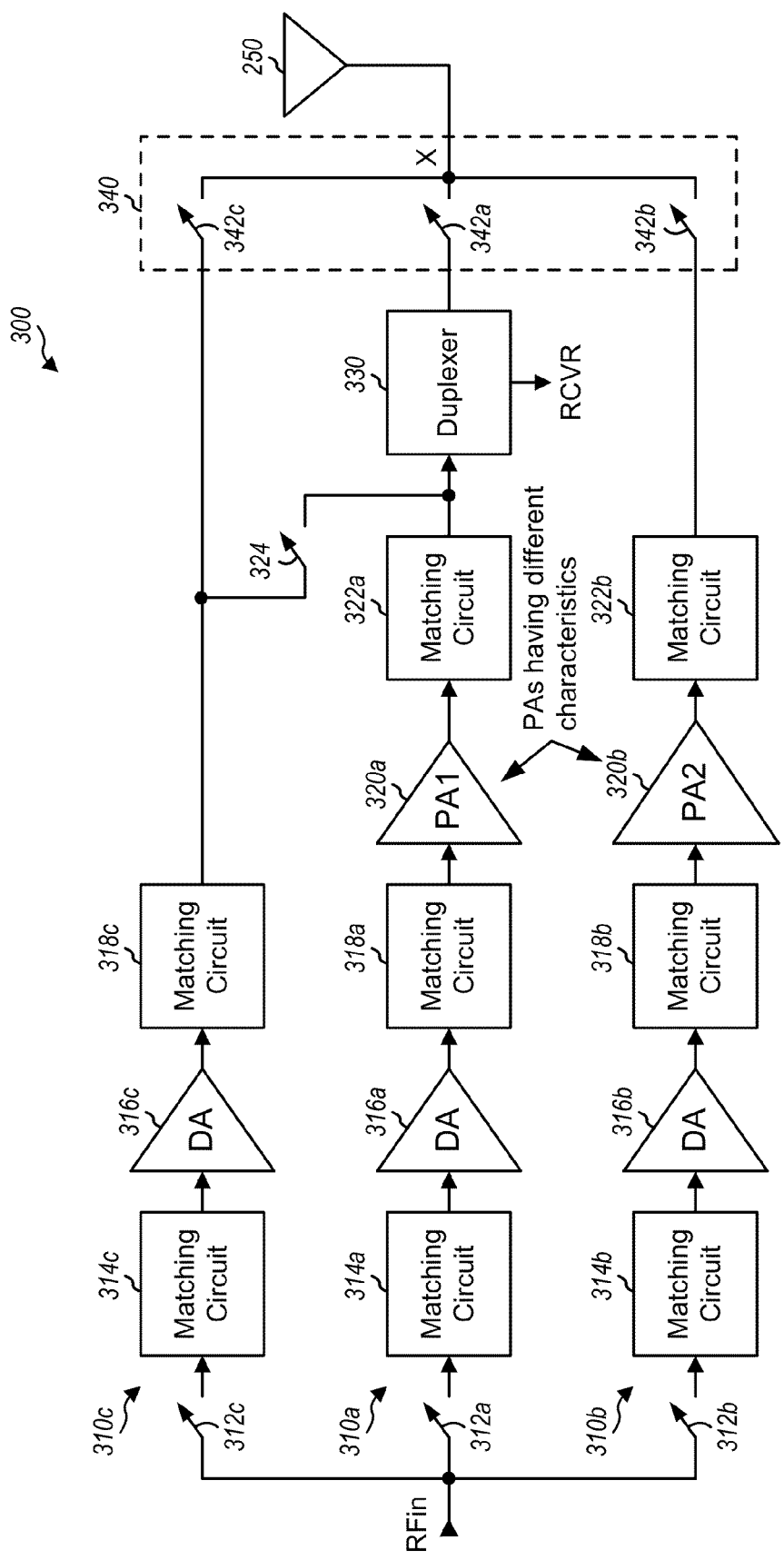
FIG. 3 shows a block diagram of a transmit module for a single antenna.

FIG. 3 shows a block diagram of an exemplary design of a transmit module 300, which may be used for power amplifier 234 and switches/duplexer 240 in FIG. 2. Transmit module 300 includes three transmit paths 310a, 310b and 310c. Transmit path 310a includes circuits from a switch 312a to a switch 342a. Transmit path 310b includes circuits from a switch 312b to a switch 342b. Transmit path 310c includes circuits from a switch 312c to a switch 342c.

Within transmit path 310a, switch 312a has one end coupled to an input (RFin) of transmit module 300 and the other end coupled to the input of an input matching circuit 314a. A driver amplifier (DA) 316a has its input coupled to the output of matching circuit 314a and its output coupled to the input of an inter-stage matching circuit 318a. A first power amplifier (PA1) 320a has its input coupled to the output of matching circuit 318a and its output coupled to the input of an output matching circuit 322a. A duplexer 330 has its transmit (TX) port coupled to the output of matching circuit 322a.

Transmit path 310b includes switch 312b, a matching circuit 314b, a driver amplifier 316b, a matching circuit 318b, a second power amplifier (PA2) 320b, and a matching circuit 322b, which are coupled in series as shown in FIG. 3. Transmit path 310c includes switch 312c, a matching circuit 314c, a driver amplifier 316c, and a matching circuit 318c, which are coupled in series as shown in FIG. 3. A switch 324 has one end coupled to the output of matching circuit 318c and the other end coupled to the TX port of duplexer 330.

Within a switchplexer 340, switch 342a is coupled between duplexer 330 and node X. Switch 342b is coupled between the output of matching circuit 322b and node X. Switch 342c is coupled between the output of matching circuit 318c and node X. Antenna 250 is also coupled to node X. Switch 342a, 342b or 342c provides an output RF signal to antenna 250. A switch (not shown in FIG. 3) may be coupled to node X and may provide a received RF signal from antenna 250 to a receiver (also not shown in FIG. 3).

In transmit path 310a, matching circuit 314a performs input impedance matching for driver amplifier 316a. Driver amplifier 316a provides amplification for an input RF signal. Matching circuit 318a performs impedance matching between the output of driver amplifier 316a and the input of power amplifier 320a. Power amplifier 320a provides amplification and high output power for the input RF signal. Matching circuit 322a performs output impedance matching for power amplifier 320a. The circuits in transmit path 310b operate in similar manner as the corresponding circuits in transmit path 310a. The circuits in transmit path 310c operate in similar manner as the corresponding circuits in transmit path 310a. Matching circuit 322b performs impedance matching between the output of power amplifier 320b and antenna 250.

Duplexer 330 supports operation in frequency division duplexing (FDD), which is utilized by many CDMA systems as well as other systems. For FDD, different frequencies are used for the downlink and uplink. Duplexer 330 can simultaneously (i) route an output RF signal from transmit path 310a or 310c to antenna 250 and (ii) route a received RF signal from antenna 250 to a receiver (RCVR), which is not shown in FIG. 3. Switches 342a to 342c support operation in time division duplexing (TDD), which is utilized by GSM systems as well as other systems. For TDD, the same frequency is used for both the downlink and uplink. Switch 342a, 342b or 342c can couple an output RF signal from duplexer 330, matching circuit 322b, or matching circuit 318c to antenna 250 during transmit intervals. A switch (not shown in FIG. 3) can couple a received RF signal from antenna 250 to a receiver (also not shown in FIG. 3).

In the exemplary design shown in FIG. 3, transmit module 300 includes two power amplifiers 320a and 320b that have different characteristics and can support different wireless systems with different requirements. In particular, power amplifier 320a may be selected to provide an output RF signal with up to +27 dBm output power in CDMA. Power amplifier 320b may be selected to provide an output RF signal with up to +33 dBm output power in GSM. The two power amplifiers 320a and 320b are different and may have different gains, different maximum output power levels, different transistor sizes, different bias currents, different bias voltages, different external matching networks, etc., in order to meet the requirements of CDMA and GSM.

Either power amplifier 320a or 320b may be selected depending on the particular system with which a wireless device is in communication. No power amplifier may also be selected when transmit path 310c is used for low output power.

Transmit module 300 supports a number of operating modes. Each operating mode is associated with a different signal path for an input RF signal from the input of transmit module 300 to antenna 250. One operating mode may be selected at any given moment. The signal path for the selected operating mode may be obtained by properly controlling the switches within transmit module 300. One of the switches in switchplexer 340 may be closed during a transmit interval, and one of the switches in switchplexer 340 may be closed during a receive interval. For all operating modes, a single input RF signal is applied to transmit module 300, and a single output RF signal is provided by transmit module 300. The input RF signal may be amplified by either power amplifier 320a or 320b, or no power amplifier.

Table 1 lists three operating modes supported by transmit module 300 and also provides the selected power amplifier, if any, and the switch settings for each operating mode. Additional operating modes may also be supported with more switches.

TABLE 1

Operating Modes for Transmit Module 300

| Mode | Selected Power Amplifier | Switch Settings |
|---|---|---|
| CDMA | Power amplifier 320a is selected | Switches 312a and 342a are closed; other switches are opened |
| GSM | Power amplifier 320b is selected | Switches 312b and 342b are closed; other switches are opened |
| Bypass | Power amplifiers 320a and 320b are not selected | Switch 312c and switch 342c (or switches 324 and 342a) are closed; other switches are opened |

It may be desirable to support simultaneous transmission from multiple antennas by a wireless device. The multiple antennas may be used to support MIMO to achieve higher throughput, transmit diversity to improve reliably, carrier aggregation to increase throughput, and/or other transmission schemes to improve performance.

Figure 4:
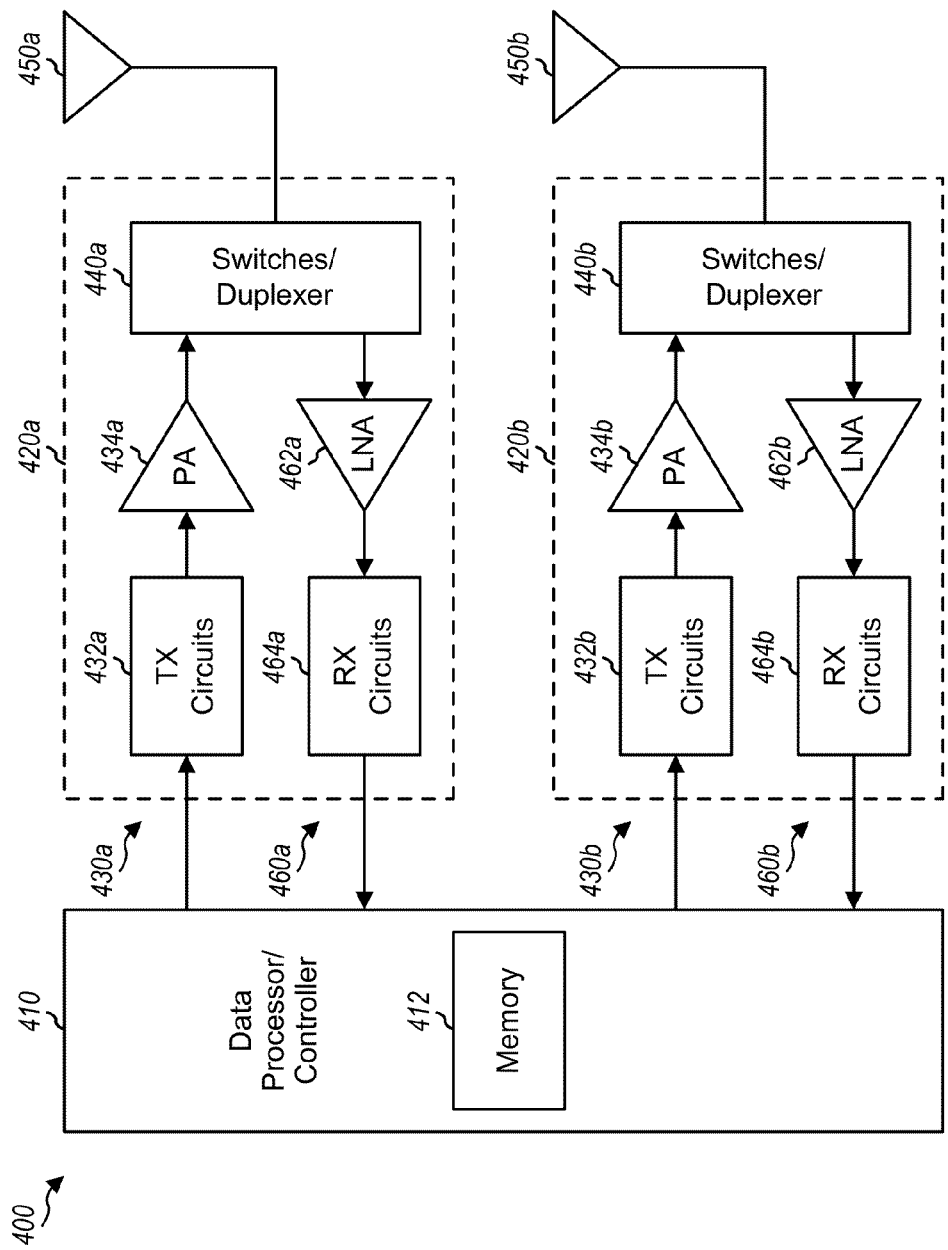
FIG. 4 shows a block diagram of a wireless device with two antennas.

FIG. 4 shows a block diagram of a wireless device 400, which may be another exemplary design of wireless device 110 in FIG. 1. In this exemplary design, wireless device 400 includes a data processor/controller 410, two transceivers 420a and 420b, and two antennas 450a and 450b. Wireless device 400 may support CDMA, GSM, LTE, 802.11, etc.

Transceiver 420a includes a transmitter 430a and a receiver 460a that support bi-directional wireless communication via antenna 450a. Transmitter 430a includes TX circuits 432a and a power amplifier 434a coupled to switches/duplexer 440a. Receiver 460a includes RX circuits 464a and an LNA 462a coupled to switches/duplexer 440a. Similarly, transceiver 420b includes a transmitter 430b and a receiver 460b that support bi-directional wireless communication via antenna 450b. Transmitter 430b includes TX circuits 432b and a power amplifier 434b coupled to switches/duplexer 440b. Receiver 460b includes RX circuits 464b and an LNA 462b coupled to switches/duplexer 440b. The circuits in transmitters 430a and 430b may operate as described above for the corresponding circuits in transmitter 230 in FIG. 2. The circuits in receivers 460a and 460b may operate as described above for the corresponding circuits in receiver 260 in FIG. 2.

All or a portion of transceivers 420a and 420b may be implemented on one or more analog integrated circuits (ICs), RF ICs (RFICs), mixed-signal ICs, etc. For example, TX circuits 432a and 432b, power amplifiers 434a and 434b, LNAs 462a and 462b, and RX circuits 464a and 464b may be implemented on an RFIC. Power amplifiers 434a and 434b and possibly other circuits may also be implemented on a separate IC or module.

Data processor/controller 410 may perform various functions for wireless device 400. For example, data processor 410 may perform processing for data being transmitted via transmitters 430a and 430b and received via receivers 460a and 460b. Controller 410 may control the operation of TX circuits 432a and 432b, power amplifiers 434a and 434b, RX circuits 464a and 464a, LNAs 462a and 462b, and/or switches/duplexers 440a and 440b. A memory 412 may store program codes and data for data processor/controller 410. Memory 412 may be internal to data processor/controller 410 (as shown in FIG. 4) or external to data processor/controller 410 (not shown in FIG. 4). Data processor/controller 410 may be implemented on one or more application specific integrated circuits (ASICs) and/or other ICs.

FIG. 4 shows an exemplary design of wireless device 400 with two antennas 450a and 450b. In general, a wireless device may include any number of antennas, any number of transmitters, and any number of receivers. A wireless device may include (i) both a transmitter and a receiver to support data transmission and reception via a given antenna, or (ii) only a transmitter to support data transmission via the antenna, or (iii) only a receiver to support data reception via the antenna. A wireless device may also support operation on any number of frequency bands. A wireless device may include one or more transmitters and/or one or more receivers for each antenna. Each transmitter and each receiver may support operation on one or more frequency bands for a given antenna.

Figure 5:
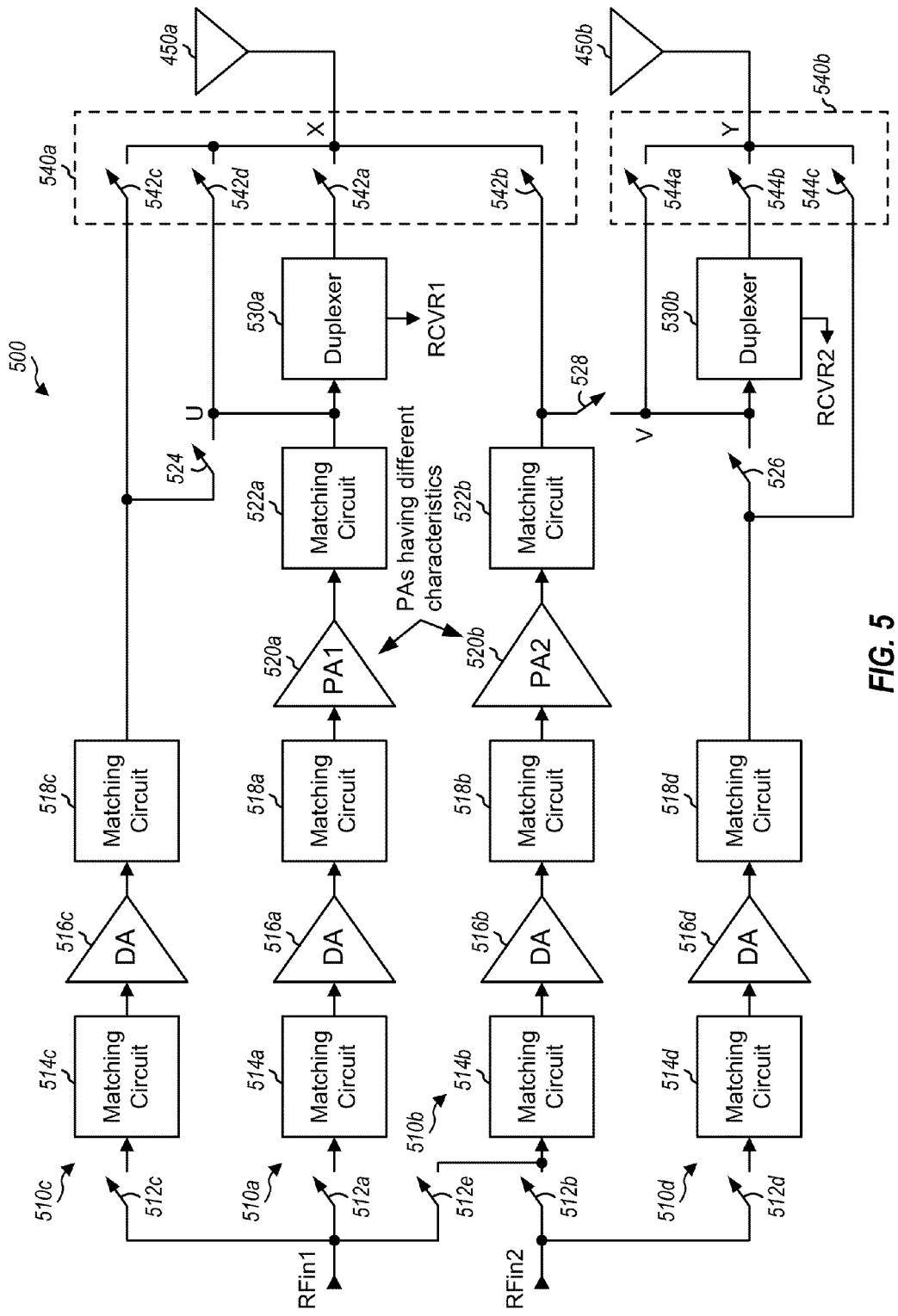
FIG. 5 shows a block diagram of a transmit module with power amplifiers having different characteristics for two antennas.

FIG. 5 shows a block diagram of an exemplary design of a transmit module 500, which may be used for power amplifiers 434a and 434b and switches/duplexers 440a and 440b in FIG. 4. Transmit module 500 includes four transmit paths 510a, 510b, 510c and 510d. Transmit path 510a includes a switch 512a, a matching circuit 514a, a driver amplifier 516a, a matching circuit 518a, a first power amplifier (PA1) 520a, and a matching circuit 522a coupled in series, as shown in FIG. 5. Transmit path 510b includes a switch 512b, a matching circuit 514b, a driver amplifier 516b, a matching circuit 518b, a second power amplifier (PA2) 520b, and a matching circuit 522b coupled in series. Transmit path 510c includes a switch 512c, a matching circuit 514c, a driver amplifier 516c, and a matching circuit 518c coupled in series. Transmit path 510d includes a switch 512d, a matching circuit 514d, a driver amplifier 516d, and a matching circuit 518d coupled in series. The circuits in transmit paths 510a, 510b, 510c and 510d operate as described above for the corresponding circuits in transmit paths 310a, 310b, 310c and 310c, respectively, in FIG. 3. A switch 524 is coupled between the output of matching circuit 518c and node U. A switch 526 is coupled between the output of matching circuit 518d and node V. A switch 528 is coupled between the output of matching circuit 522b and node V.

Transmit module 500 further includes a duplexer 530a and a switchplexer 540a for antenna 450a. Duplexer 530a has a TX port coupled to the output of matching circuit 522a at node U and an RX port coupled to a first receiver (RCVR1), which is not shown in FIG. 5. Within switchplexer 540a, a switch 542a is coupled between duplexer 530a and node X. A switch 542b is coupled between the output of matching circuit 522b and node X. A switch 542c is coupled between the output of matching circuit 518c and node X. A switch 542d is coupled between node U and node X. A switch (not shown in FIG. 5) may also be coupled between node X and a receiver (also not shown in FIG. 5). Antenna 450a is coupled to node X.

Transmit module 500 further includes a duplexer 530b and a switchplexer 540b for antenna 450b. Duplexer 530b has a TX port coupled to switches 526 and 528 at node V and an RX port coupled to a second receiver (RCVR2), which is not shown in FIG. 5. Within switchplexer 540b, a switch 544a is coupled between node V and node Y. A switch 544b is coupled between duplexer 530b and node Y. A switch 544c is coupled between the output of matching circuit 518d and node Y. A switch (not shown in FIG. 5) may also be coupled between node Y and a receiver (also not shown in FIG. 5). Antenna 450b is coupled to node Y.

Transmit module 500 includes two inputs, RFin1 and RFin2, that can receive one or two input RF signals at any given moment. Switches 512a and 512c are coupled to the RFin1 input, and switches 512b and 512d are coupled to the RFin2 input. A switch 512e is coupled between the RFin1 input and the input of matching circuit 514b. A switch may be coupled between the RFin2 input and the input of matching circuit 514a (not shown in FIG. 5).

FIG. 5 shows an exemplary design of transmit module 500. A transmit module may also be implemented in other manners. For example, matching circuits 514c and 518c and driver amplifier 516c may be omitted, and a switch may be coupled between the output (or an internal node) of matching circuit 518a and node U. In this case, matching circuits 514a and 518a and driver amplifier 516a may be reused for the bypass mode. Similarly, matching circuits 514d and 518d and driver amplifier 516d may be omitted, and a switch may be coupled between the output (or an internal node) of matching circuit 518b and node V.

Power amplifiers 520a and 520b may have different characteristics and performance, e.g., different gains, different maximum output power levels, different linearity, etc. This may be achieved by implementing power amplifiers 520a and 520b with different circuit designs, different transistor sizes, different circuit layouts, different biasing, etc., for the two power amplifiers. Power amplifiers 520a and 520b may be implemented on the same IC die or different IC dies.

In the exemplary design shown in FIG. 5, transmit module 500 includes all of the circuits in transmit module 300 in FIG. 3, and these circuits may operate as described above for FIG. 3. Transmit module 500 also includes a transmit path 510d that may be used for antenna 450b for low output power. Transmit module 500 further includes duplexer 530b and switchplexer 540b to support transmission via antenna 450b. Transmit module 500 also includes switch 512a to 512e that can support transmission of one or two input RF signals via the two antennas 450a and 450b.

Transmit module 500 supports a number of operating modes. Table 2 lists five operating modes supported by transmit module 500 and also provides the selected power amplifier, if any, and the switch settings for each operating mode.

TABLE 2

Operating Modes for Transmit Module 500

| Mode | Selected Power Amplifier(s) | Switch Settings |
|---|---|---|
| CDMA | Power amplifier 520a is selected for transmission via one antenna 450a | Switches 512a and 542a are closed; other switches are opened |
| GSM | Power amplifier 520b is selected for transmission via one antenna 450a | Switches 512e and 542b are closed; other switches are opened |
| MIMO | Both power amplifiers 520a and 520b are selected for transmission of two RF signals via two antennas 450a and 450b | Switches 512a, 512b, 542a (or 542d), 528, and 544b (or 544a) are closed; other switches are opened |
| Transmit Diversity | Both power amplifiers 520a and 520b are selected for transmission of one RF signal via two antennas 450a and 450b | Switches 512a, 512e, 542a (or 542d), 528, and 544b (or 544a) are closed; other switches are opened |
| Bypass | Power amplifiers 520a and 520b are not selected; one or two RF signals are transmitted via one or two antennas | Switches 512c, 512d, 542c (or 524 and 542a), and 544c (or 526 and 544b) are closed; other switches are opened |

Additional operating modes may also be supported. For example, two input signals that are phase shifted from one another may be amplified by power amplifiers 520a and 520b and transmitted via antennas 450a and 450b for transmit diversity. As another example, two input signals each carrying data on a different carrier may be amplified by power amplifiers 520a and 520b and transmitted via antennas 450a and 450b for carrier aggregation. A carrier may correspond to a range of frequencies, which may be 1.23 MHz for cdma2000, 5 MHz for WCDMA, 20 MHz for LTE, etc.

FIG. 6A shows a signal path in transmit module 500 in FIG. 5 for the CDMA mode. In the CDMA mode, a single input RF signal (e.g., a CDMA signal) is amplified by a single power amplifier 520a and transmitted via a single antenna 450a. The input RF signal is routed through switch 512a and matching circuit 514a, amplified by driver amplifier 516a, routed through matching circuit 518a, amplified by power amplifier 520a, and routed through matching circuit 522a, duplexer 530a, and switch 542a to antenna 450a. Power amplifier 520a can provide the required maximum output power (e.g., +27 dBm) for CDMA.

FIG. 6B shows a signal path in transmit module 500 for the GSM mode. In the GSM mode, a single input RF signal (e.g., a GSM signal) is amplified by a single power amplifier 520b and transmitted via a single antenna 450a. The input RF signal is routed through switch 512e and matching circuit 514b, amplified by driver amplifier 516b, routed through matching circuit 518b, amplified by power amplifier 520b, and routed through matching circuit 522b and switch 542b to antenna 450a. Power amplifier 520b can provide the required maximum output power (e.g., +33 dBm) for GSM.

FIG. 6C shows signal paths in transmit module 500 for the MIMO mode. In the MIMO mode, two input RF signals are amplified by two power amplifiers 520a and 520b and transmitted via two antennas 450a and 450b. A first input RF signal is routed through switch 512a and matching circuit 514a, amplified by driver amplifier 516a, routed through matching circuit 518a, amplified by power amplifier 520a, and routed through matching circuit 522a. The first input RF signal may further be routed (i) through switch 542d to antenna 450a for TDD (as shown in FIG. 6C) or (ii) through duplexer 530a and switch 542a to antenna 450a for FDD (not shown in FIG. 6C). A second input RF signal is routed through switch 512b and matching circuit 514b, amplified by driver amplifier 516b, routed through matching circuit 518b, amplified by power amplifier 520b, and routed through matching circuit 522b and switch 528. The second input RF signal may further be routed (i) through switch 544a to antenna 450b for TDD (as shown in FIG. 6C) or (ii) through duplexer 530b and switch 544b to antenna 450b for FDD (not shown in FIG. 6C). Power amplifiers 520a and 520b can provide the required maximum output power for the two output RF signals transmitted via antennas 450a and 450b for MIMO.

FIG. 6D shows signal paths in transmit module 500 for the transmit diversity mode. In the transmit diversity mode, a single input RF signal is amplified by two power amplifiers 520a and 520b and transmitted via two antennas 450a and 450b. The input RF signal is routed through switch 512a and matching circuit 514a, amplified by driver amplifier 516a, routed through matching circuit 518a, amplified by power amplifier 520a, and routed through matching circuit 522a, and either switch 542d (as shown in FIG. 6D) or duplexer 530a and switch 542a (not shown in FIG. 6D) to antenna 450a. The input RF signal is also routed through switch 512e and matching circuit 514b, amplified by driver amplifier 516b, routed through matching circuit 518b, amplified by power amplifier 520b, and routed through matching circuit 522b, switch 528, and either switch 544a (as shown in FIG. 6D) or duplexer 530b and switch 542b (not shown in FIG. 6D) to antenna 450b. Power amplifiers 520a and 520b can provide the required maximum output power for the two output RF signals transmitted via antennas 450a and 450b for transmit diversity.

Figure 6E:
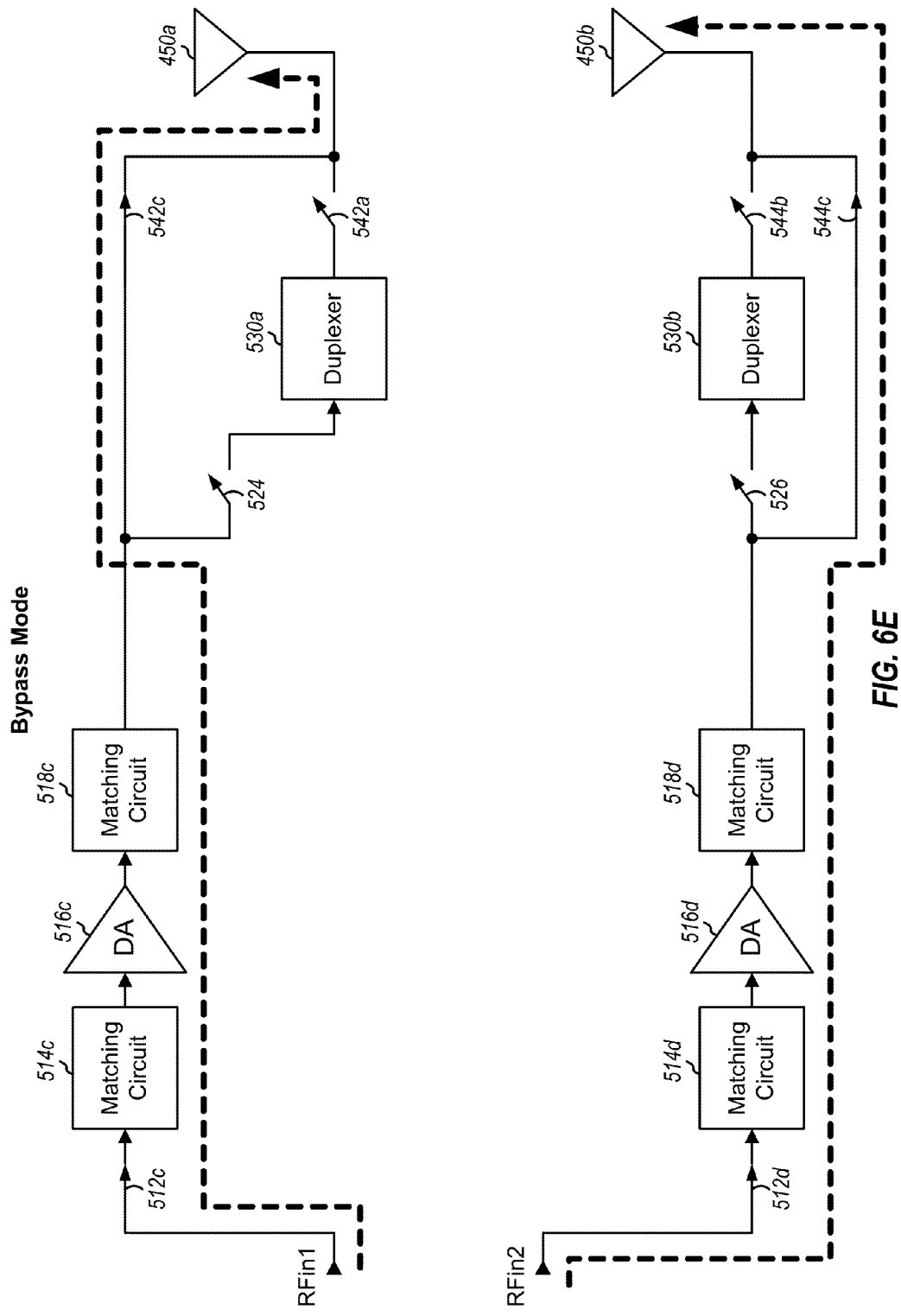

FIG. 6E shows signal paths in transmit module 500 for the bypass mode. In the bypass mode, one or more input RF signals are amplified by one or more driver amplifiers and transmitted via one or more antennas. A first input RF signal is routed through switch 512c and matching circuit 514c, amplified by driver amplifier 516c, and routed through matching circuit 518c and switch 542c (or switch 524, duplexer 530a, and switch 542a) to antenna 450a. The first input RF signal or a second input RF signal is routed through switch 512d and matching circuit 514d, amplified by driver amplifier 516d, and routed through matching circuit 518d and switch 544c (or switch 526, duplexer 530b, and switch 544b) to antenna 450b. Driver amplifiers 516c and 516d can provide the desired output power for the output RF signals transmitted via antennas 450a and 450b in the bypass mode.

As shown in FIGS. 3 and 5, few additional circuitry may be used to support MIMO, transmit diversity, and carrier aggregation modes for two antennas as well as the CDMA, GSM and bypass modes already supported by a wireless device. In particular, MIMO and carrier aggregation may be supported with additional switches so that (i) two input signals can be applied to two power amplifiers and (ii) two output signals from the two power amplifiers can be provided to two antennas, as shown in FIG. 6C. Transmit diversity may be supported with additional switches so that (i) a single input signal can be applied to two power amplifiers and (ii) two output signals from the two power amplifiers can be provided to two antennas, as shown in FIG. 6D. The additional switches allow existing power amplifiers to be reused for MIMO, transmit diversity, and/or carrier aggregation, which results in little additional cost to support these modes. The ability to efficiently support MIMO, transmit diversity, and/or carrier aggregation may be especially desirable to increase uplink throughput to support video-centric activities (e.g., Skype calls), femto-cell, and Mi-fi applications.

Figure 7:
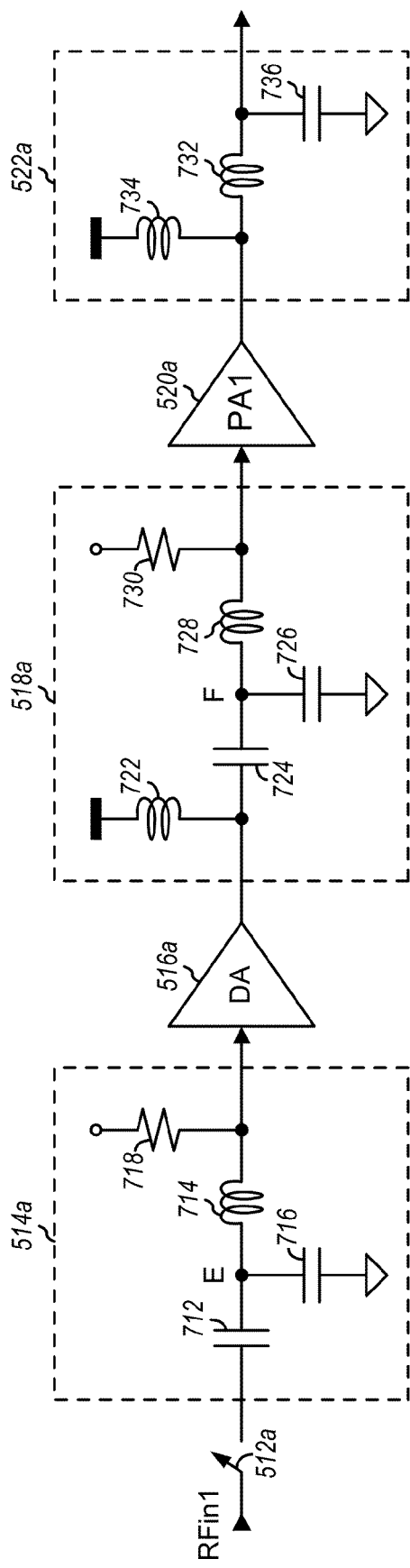
FIG. 7 shows a schematic diagram of impedance matching circuits.

FIG. 7 shows a schematic diagram of exemplary designs of the matching circuits within transmit module 500 in FIG. 5. For clarity, only circuits in transmit path 510a are shown in FIG. 7. Within matching circuit 514a, a capacitor 712 has one end coupled to switch 512a and the other end coupled to node E. An inductor 714 is coupled between node E and the input of driver amplifier 516a. A capacitor 716 is coupled between node E and circuit ground. A resistor 718 is coupled between the input of driver amplifier 516a and a bias voltage.

Within matching circuit 518a, an inductor 722 is coupled between the output of driver amplifier 516a and a power supply. A capacitor 724 is coupled between the output of driver amplifier 516a and node F. A capacitor 726 is coupled between node F and circuit ground. An inductor 728 is coupled between node F and the input of power amplifier 520a. A resistor 730 is coupled between the input of power amplifier 520a and a bias voltage.

Within matching circuit 522a, an inductor 732 is coupled between the input and output of matching circuit 522a. An inductor 734 is coupled between the input of matching circuit 522a and the power supply. A capacitor 736 is coupled between output of matching circuit 522a and circuit ground.

FIG. 7 shows exemplary designs of matching circuits 514a, 518a and 522a. In general, a matching circuit may be implemented with any topology such as a lowpass network, a highpass network, a bandpass network, etc. A matching circuit may also be implemented with any number of reactive elements (e.g., inductors and capacitors) to obtain the desired performance. The reactive elements may have values selected based on the impedances at the input and output of the matching circuit. A matching circuit may also be implemented with one or more tunable reactive elements (e.g., one or more variable capacitors or varactors) to enable tuning of impedance matching. Tunable reactive elements may enable better impedance matching for different loads coupled to the matching circuit and/or different frequencies. For example, tunable reactive elements may enable matching circuit 522a to match to either duplexer 530a or antenna 450a in FIG. 5 and/or to match to antenna 450a at different frequencies.

Power amplifiers 520a and 520b in FIG. 5 may be implemented with various circuit designs. Each power amplifier may be implemented to obtain the desired characteristics and performance for that power amplifier.

FIG. 8 shows a schematic diagram of an exemplary design of a power amplifier 800, which may be used for power amplifier 520a or 520b in FIG. 5. Power amplifier 800 includes K N-channel metal oxide semiconductor (NMOS) transistors 810a through 810k coupled in a stack, where K may be any integer value. The bottommost NMOS transistor 810a has its source coupled to circuit ground and its gate receiving an input signal (PAin) via an AC coupling capacitor 822. Each higher up NMOS transistor 810 in the stack has its source coupled to the drain of another NMOS transistor below in the stack. The topmost NMOS transistor 810k has its drain providing an output signal (PAout). A load inductor 812 is coupled between a power supply (Vdd) and the drain of the topmost NMOS transistor 810k and provides DC bias current for power amplifier 800. Load inductor 812 may be part of a matching circuit that is coupled to the output of power amplifier 800. The gates of NMOS transistor 810a through 810k receive K bias voltages, Vbias1 through VbiasK, via K resistors 820a through 820k, respectively. The bias voltages may be generated to turn on power amplifier 800 when it is enabled and to turn off power amplifier 800 when it is disabled.

The PAout signal may have a large voltage swing, which may exceed a breakdown voltage of each NMOS transistor 810. The large voltage swing of the PAout signal may be split or distributed approximately equally across the K NMOS transistors 810a through 810k. Each NMOS transistor 810 may then observe only a fraction of the voltage swing, which may be less than the breakdown voltage of each NMOS transistor in order to achieve high reliability. The K bias voltages Vbias1 through VbiasK may be selected to provide the desired voltage splitting of the PAout signal, e.g., so that each NMOS transistor observes approximately 1/K-th of the voltage swing.

FIG. 8 shows an exemplary design of a power amplifier, which may also be implemented in other manners. For example, a power amplifier may be implemented with transistors of other types, or other circuit topologies, etc. The exemplary design shown in FIG. 8 may also be used for any one of the driver amplifiers in FIG. 5. Power amplifiers 520a and 520b (and also driver amplifiers) may have different requirements for input power, output power, linearity, harmonics, etc. Power amplifiers 520a and 520b (and also driver amplifiers) may thus have different numbers of stacked NMOS transistors, different transistor sizes, different load inductors, different bias voltages, different bias currents, different impedance matching circuits, and/or different characteristics for other parameters.

FIG. 9 shows a schematic diagram of a switch 900, which may be used for any one of the switches in FIG. 5. Within switch 900, M NMOS transistors 910a through 910m are coupled in a stacked, where M may be any integer value. Each NMOS transistor 910 (except for the bottommost NMOS transistor 910a) has its source coupled to the drain of the next NMOS transistor in the stack. The topmost NMOS transistor 910m has its drain receiving an input signal (Vin), and the bottommost NMOS transistor 910a has its source providing an output signal (Vout). Each NMOS transistor 910 may be implemented with a symmetric structure, and the source and drain of each NMOS transistor may be interchangeable. M resistors 920a through 920m have one end coupled to node A and the other end coupled to the gates of NMOS transistors 910a through 910m, respectively. A control signal (Vctrl) is provided to node A. The control signal may be set to a high voltage to turn on switch 900 or to a low voltage to turn off switch 900.

Resistors 920a through 920m may have relatively large resistance, e.g., in the kilo Ohms range. When NMOS transistors 910 are turned on, resistors 920 may reduce signal loss by presenting a large resistance to the Vin signal in the leakage path through the gate-to-source and gate-to-drain capacitances of each NMOS transistor. When NMOS transistors 910 are turned off, resistors 920 may help to distribute the voltage swing of the Vin signal approximately evenly across the M NMOS transistors 910 in the stack. NMOS transistors 910 may be designed with a sufficiently large size in order to reduce the on resistance when switch 900 is turned on.

Although not shown in FIG. 9, M resistors may be coupled between the drain and source of NMOS transistors 910a through 910m, one resistor for each NMOS transistor 910. These resistors may maintain the sources of NMOS transistors 910b through 910m at approximately the same voltage when switch 900 is in the off state. This may then result in matching bias conditions for all M NMOS transistors 910a through 910m, which may result in equal voltage splitting during the off state.

FIG. 9 shows an exemplary design of a switch, which may also be implemented in other manners. For example, a switch may be implemented with transistors of other types, or with other circuit topologies, etc. A switch may also be implemented with micro-electro-mechanical system (MEMS), silicon-on-insulator (SOI), or some other semiconductor process technology.

In an exemplary design, an apparatus (e.g., a wireless device, an IC, a circuit module, etc.) may comprise first and second power amplifiers. The first power amplifier (e.g., power amplifier 520a in FIG. 5) may amplify a first input signal and provide a first output signal for a first antenna (e.g., antenna 450a) in a first operating mode. The second power amplifier (e.g., power amplifier 520b) may amplify the first input signal or a second input signal and provide a second output signal for a second antenna (e.g., antenna 450b) in the first operating mode. The first and second power amplifiers may have different characteristics, e.g., different gains, different maximum output power levels, different circuit designs, different transistor sizes, different bias voltages, different bias currents, etc.

In an exemplary design, the first and second power amplifiers may amplify the first and second input signals (i.e., different input signals) and provide the first and second output signals for the first and second antennas for MIMO transmission in the first operating mode (e.g., as shown in FIG. 6C). In another exemplary design, the first and second power amplifiers may both amplify the first input signal (i.e., the same input signal) and provide the first and second output signals for the first and second antennas for transmit diversity in the first operating mode (e.g., as shown in FIG. 6D). In yet another exemplary design, the first power amplifier may amplify the first input signal for a first carrier and the second power amplifier may amplify the second input signal for a second carrier for carrier aggregation in the first operating mode.

In an exemplary design, the first power amplifier may amplify a third input signal (e.g., a CDMA signal) and provide a third output signal for the first antenna in a second operating mode (e.g., as shown in FIG. 6A). The second power amplifier may amplify a fourth input signal (e.g., a GSM signal) and provide a fourth output signal for the first antenna in a third operating mode (e.g., as shown in FIG. 6B). The second power amplifier may be disabled in the second operating mode, and the first power amplifier may be disabled in the third operating mode. In an exemplary design, the second and third operating modes may be associated with different radio technologies (e.g., CDMA and GSM), and the fourth output signal may have a higher maximum output power than the third output signal.

In an exemplary design, a driver amplifier (e.g., driver amplifier 516c in FIG. 5) may amplify an input signal and provide an output signal for the first antenna in a fourth operating mode (e.g., a bypass mode, as shown in FIG. 6E). This input signal is not amplified by any power amplifier in the fourth operating mode.

In an exemplary design, a first driver amplifier (e.g., driver amplifier 516a in FIG. 5) may amplify the first input signal in the first operating mode. A first matching circuit (e.g., matching circuit 518a) may be coupled between the first driver amplifier and the first power amplifier. A second driver amplifier (e.g., driver amplifier 516b) may amplify the first or second input signal in the first operating mode. A second matching circuit (e.g., matching circuit 518b) may be coupled between the second driver amplifier and the second power amplifier. In an exemplary design, a third matching circuit (e.g., matching circuit 522a) may be coupled to the output of the first power amplifier. A fourth matching circuit (e.g., matching circuit 522b) may be coupled to the output of the second power amplifier.

In an exemplary design, a first duplexer (e.g., duplexer 530a) may be coupled between the first power amplifier and the first antenna. A second duplexer (e.g., duplexer 530b) may be coupled between the second power amplifier and the second antenna.

In an exemplary design, a first switch (e.g., switch 512a) may route the first input signal toward the first power amplifier in the first operating mode when the first switch is enabled. A second switch (e.g., switch 512e) may route the first input signal toward the second power amplifier in the first operating mode when the second switch is enabled. A third switch (e.g., switch 512b) may route the second input signal toward the second power amplifier in the first operating mode when the third switch is enabled. In an exemplary design, a fourth switch (e.g., switch 542a or 542d) may route the first output signal from the first power amplifier toward the first antenna in the first operating mode. A fifth switch (e.g., switch 544a or 544b) may route the second output signal from the second power amplifier toward the second antenna in the first operating mode.

In an exemplary design, the first and second power amplifiers may be fabricated on a single IC. In another exemplary design, the first and second power amplifiers may be fabricated on two separate ICs.

Figure 10:
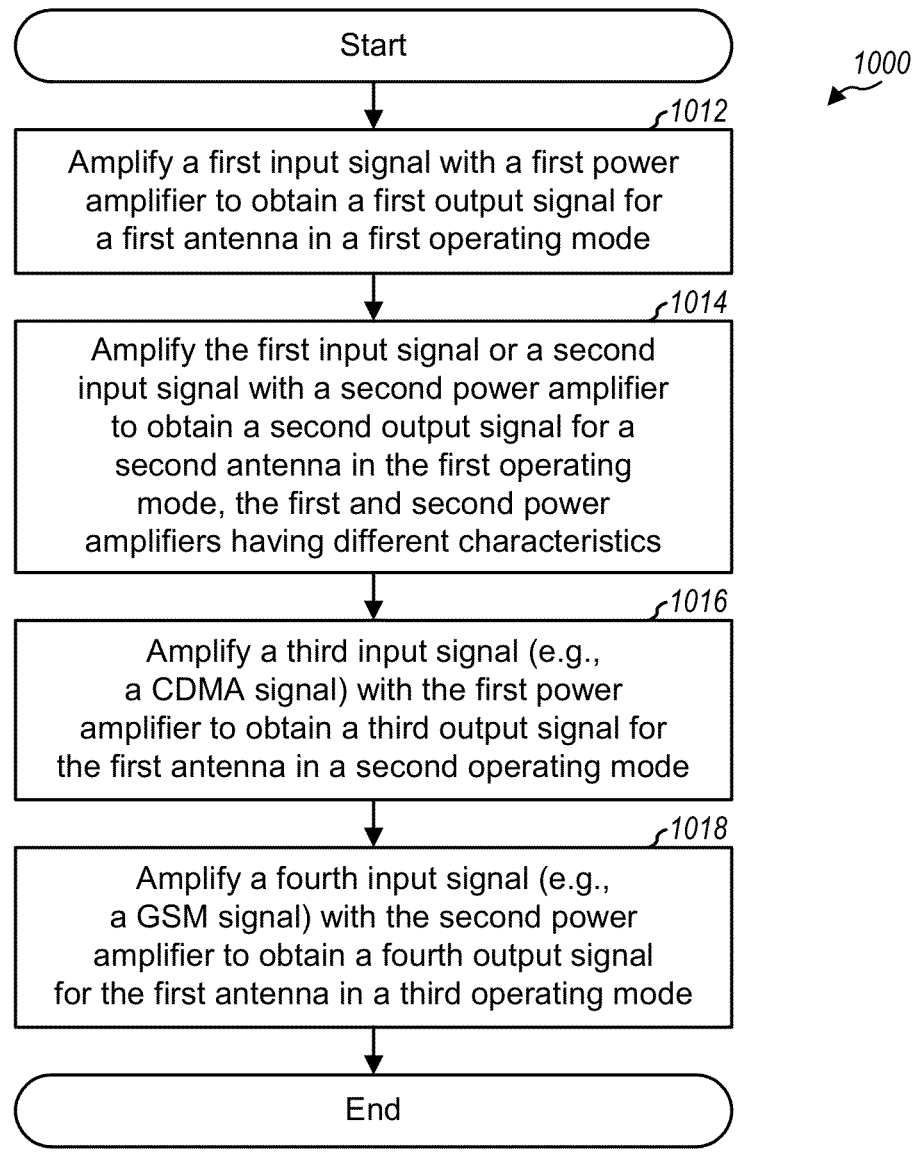
FIG. 10 shows a process for performing amplification by a wireless device.

FIG. 10 shows an exemplary design of a process 1000 for performing amplification by a wireless device. A first input signal may be amplified with a first power amplifier to obtain a first output signal for a first antenna in a first operating mode (block 1012). The first input signal or a second input signal may be amplified with a second power amplifier to obtain a second output signal for a second antenna in the first operating mode (block 1014). The first and second power amplifiers may have different characteristics.

In an exemplary design, the first and second input signals (i.e., different input signals) may be amplified with the first and second power amplifiers to obtain the first and second output signals for the first and second antennas for MIMO transmission in the first operating mode. In another exemplary design, the first input signal (i.e., the same input signal) may be amplified with both the first and second power amplifiers to obtain the first and second output signals for the first and second antennas for transmit diversity in the first operating mode. In yet another exemplary design, the first input signal for a first carrier may be amplified with the first power amplifier and the second input signal for a second carrier may be amplified with the second power amplifier to obtain the first and second output signals for the first and second antennas for carrier aggregation in the first operating mode.

In an exemplary design, a third input signal (e.g., a CDMA signal) may be amplified with the first power amplifier to obtain a third output signal for the first antenna in a second operating mode (block 1016). A fourth input signal (e.g., a GSM signal) may be amplified with the second power amplifier to obtain a fourth output signal for the first antenna in a third operating mode (block 1018). The second power amplifier may be disabled in the second operating mode, and the first power amplifier may be disabled in the third operating mode.

Power amplifiers having different characteristics and supporting transmission on multiple antennas, as described herein, may be implemented on an IC, an analog IC, an RFIC, a mixed-signal IC, an ASIC, a printed circuit board (PCB), an electronic device, etc. The power amplifiers may also be fabricated with various IC process technologies such as complementary metal oxide semiconductor (CMOS), NMOS, P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the power amplifiers having different characteristics described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus comprising:
a first power amplifier configured to amplify a first input signal received on a first input of a transmit module and provide a first output signal for a first antenna; and
a second power amplifier configured to amplify the first input signal in a mode and a second input signal in a different mode and provide a second output signal for a second antenna, the second input signal received on a second input of the transmit module and the first and second power amplifiers having different characteristics.

2. The apparatus of claim 1, wherein the first and second power amplifiers have at least one of a different gains, different maximum output power levels, different circuit designs, different transistor sizes, different bias voltages, and different bias currents.

3. The apparatus of claim 1, wherein the first and second power amplifiers are configured to amplify the first and second input signals and provide the first and second output signals for the first and second antennas for multiple-input multiple-output (MIMO) transmission.

4. The apparatus of claim 1, wherein the first and second power amplifiers are both configured to amplify the first input signal and provide the first and second output signals for the first and second antennas for transmit diversity.

5. The apparatus of claim 1, wherein the first power amplifier is configured to amplify the first input signal for a first carrier and the second power amplifier is configured to amplify the second input signal for a second carrier for carrier aggregation.

6. The apparatus of claim 1, wherein the first and second power amplifiers are configured to concurrently provide the first and second output signals for the first and second antennas in a first operating mode, wherein only the first power amplifier is configured to amplify a third input signal and provide a third output signal for the first antenna in a second operating mode, and wherein only the second power amplifier is configured to amplify a fourth input signal and provide a fourth output signal for the first antenna in a third operating mode.

7. The apparatus of claim 6, wherein the second power amplifier is disabled in the second operating mode and the first power amplifier is disabled in the third operating mode.

8. The apparatus of claim 6, wherein the second and third operating modes are associated with different radio technologies, and wherein the fourth output signal has a higher maximum output power than the third output signal.

9. The apparatus of claim 6, further comprising:
a driver amplifier configured to amplify a fifth input signal and provide a fifth output signal for the first antenna in a fourth operating mode, the fifth input signal is not amplified by any power amplifier in the fourth operating mode.

10. The apparatus of claim 1, further comprising:
a first driver amplifier configured to amplify the first input signal;
a first matching circuit coupled between the first driver amplifier and the first power amplifier;
a second driver amplifier configured to amplify the first or second input signal; and
a second matching circuit coupled between the second driver amplifier and the second power amplifier.

11. The apparatus of claim 1, further comprising:
a first switch configured to route the first input signal toward the first power amplifier when the first switch is enabled;
a second switch configured to route the first input signal toward the second power amplifier when the second switch is enabled; and
a third switch configured to route the second input signal toward the second power amplifier when the third switch is enabled.

12. The apparatus of claim 1, further comprising:
a first switch configured to route the first output signal from the first power amplifier toward the first antenna when the first switch is enabled; and
a second switch configured to route the second output signal toward the second antenna when the second switch is enabled.

13. The apparatus of claim 1, wherein the first and second power amplifiers are fabricated on a single integrated circuit (IC).

14. A method comprising:
amplifying a first input signal received on a first input of a transmit module with a first power amplifier to obtain a first output signal for a first antenna; and
amplifying the first input signal in a mode and a second input signal in a different mode, each of the modes amplified with a second power amplifier to obtain a second output signal for a second antenna, the second input signal received on a second input of the transmit module and the first and second power amplifiers having different characteristics.

15. The method of claim 14, wherein the amplifying the first input signal or the second input signal with the second power amplifier comprises amplifying the second input signal with the second power amplifier to obtain the second output signal for the second antenna, the first and second output signals being transmitted via the first and second antennas for multiple-input multiple-output (MIMO) transmission.

16. The method of claim 14, wherein the amplifying the first input signal or the second input signal with the second power amplifier comprises amplifying the first input signal with the second power amplifier to obtain the second output signal for the second antenna, the first and second output signals being transmitted via the first and second antennas for transmit diversity.

17. The method of claim 14, wherein the amplifying the first input signal with the first power amplifier comprises amplifying the first input signal for a first carrier with the first power amplifier, and wherein the amplifying the first input signal or the second input signal with the second power amplifier comprises amplifying the second input signal for a second carrier with the second power amplifier to obtain the second output signal for the second antenna, the first and second output signals being transmitted via the first and second antennas for carrier aggregation.

18. The method of claim 14, wherein the first and second power amplifiers are configured to concurrently provide the first and second output signals for the first and second antennas in a first operating mode, the method further comprising:
amplifying a third input signal with the first power amplifier to obtain a third output signal for the first antenna in a second operating mode;
disabling the second power amplifier in the second operating mode;
amplifying a fourth input signal with the second power amplifier to obtain a fourth output signal for the first antenna in a third operating mode; and
disabling the first power amplifier in the third operating mode.

19. An apparatus comprising:
first means for amplifying configured to amplify a first input signal received on a first input of a transmit module and provide a first output signal for a first antenna; and
second means for amplifying configured to amplify the first input signal in a mode and a second input signal in a different mode and provide a second output signal for a second antenna, the second input signal received on a second input of the transmit module and the first means for amplifying and the second means for amplifying having different characteristics.

20. The apparatus of claim 19, wherein the second means for amplifying is configured to amplify the second input signal and provide the second output signal for the second antenna, the first and second output signals being transmitted via the first and second antennas for multiple-input multiple-output (MIMO) transmission.

21. The apparatus of claim 19, wherein the second means for amplifying is configured to amplify the first input signal and provide the second output signal for the second antenna, the first and second output signals being transmitted via the first and second antennas for transmit diversity.

22. The apparatus of claim 19, wherein the first means for amplifying is configured to amplify the first input signal for a first carrier and provide the first output signal for the first antenna, and wherein the second means for amplifying is configured to amplify the second input signal for a second carrier and provide the second output signal for the second antenna, the first and second output signals being transmitted via the first and second antennas for carrier aggregation.

* * * * *